(12) United States Patent
Caldwell

(10) Patent No.: US 6,588,271 B2
(45) Date of Patent: Jul. 8, 2003

(54) LIQUID LEVEL CHANGE SENSOR

(76) Inventor: Joseph W. Caldwell, 7177 Four Rivers Rd., Boulder, CO (US) 80301

( * ) Notice: Subject to any disclaimer, the term of this patent is extended or adjusted under 35 U.S.C. 154(b) by 0 days.

(21) Appl. No.: 09/922,313

(22) Filed: Aug. 6, 2001

(65) Prior Publication Data

US 2002/0189347 A1 Dec. 19, 2002

Related U.S. Application Data

(60) Provisional application No. 60/298,643, filed on Jun. 18, 2001.

(51) Int. Cl.[7] ............................................. G01F 23/32
(52) U.S. Cl. ....................................... 73/317; 73/290 R
(58) Field of Search .......................... 73/313, 317, 319, 73/290 R

(56) References Cited

U.S. PATENT DOCUMENTS 4,574,631 A * 3/1986 Johnson, Jr. ................. 73/317
6,216,534 B1 * 4/2001 Ross, Jr. et al. ............. 73/317
6,336,362 B1 * 1/2002 Duenas ......................... 73/313

* cited by examiner

Primary Examiner—Helen Kwok
Assistant Examiner—Rodney Frank

(57) ABSTRACT

A liquid level change indicator is described as an apparatus. which generates a visual indication when a liquid level in a controlled vessel has changed and indicates amount of change for a timed period. Operation of the instrument entails positioning the apparatus in the liquid containment vessel from a support chain. Positioning, is accomplished by a course chain adjustment, followed by a fine-threaded-nut adjustment. A float centering itself in a concentric circle sight gauge indicates initial correct monitoring position. Deviation from one of the concentric rings constitutes a liquid level change. Each concentric ring indicates a larger level change relative to the innermost sight ring per unit test time.

1 Claim, 1 Drawing Sheet

SENSOR ASSEMBLY
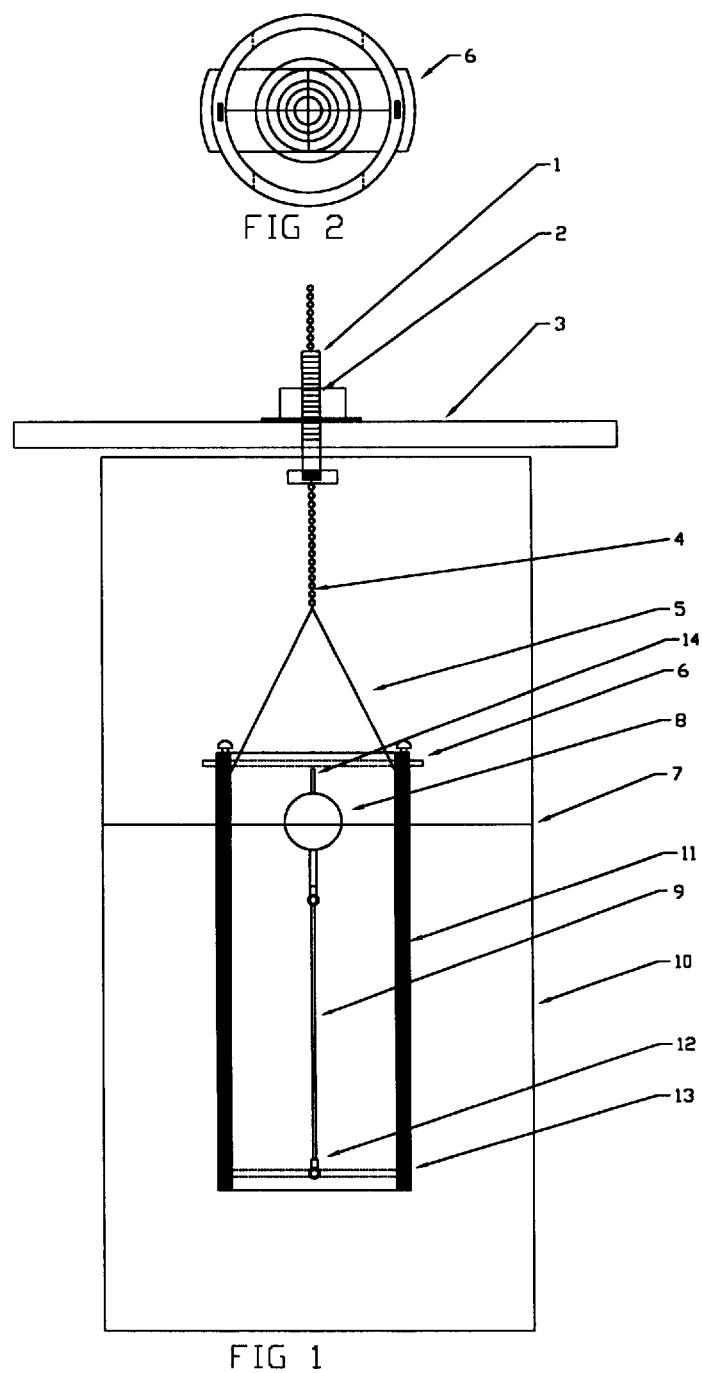
FIG 2
FIG 1
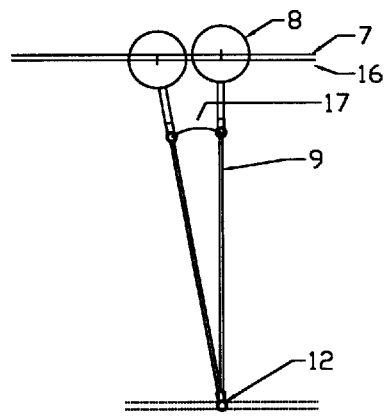
FIG 3

LIQUID LEVEL CHANGE SENSOR

CROSS-REFERENCE TO RELATED APPLICATIONS

Provisional Application date Jun. 18, 2001 jc973 U.S. PTO 60/298,643

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Liquid level sensors have been disclosed using magnetic, pressure or acoustical parameters for producing a sensible output. This invention embodies a sensible optical output driven by a float displacement representing liquid level change.

BRIEF SUMMARY OF THE INVENTION

A liquid level change indicator is described as an apparatus, which generates a visual indication when a liquid level in a controlled vessel has changed and indicates amount of change for a timed period. Operation of the instrument entails positioning the apparatus in the liquid containment vessel from a support chain. Positioning is accomplished by a course chain adjustment followed by a fine-threaded-nut adjustment. A float centered by fine adjustment in a concentric circle sight gauge on one of the first two circles indicates initial correct monitoring position.

Deviation of the float from the initial concentric circle constitutes a liquid level change. Each concentric ring indicates a larger level change relative to the innermost sight ring per unit test time. The principle of operation depends on the forces of buoyancy and center of gravity and the righting arm moment. Liquid level changes, unbalance these forces and repositions the float against a calibrated scale displaying, the magnitude of liquid level change.

BRIEF DESCRIPTION OF THE SEVERAL VIEWS OF THE DRAWING

FIG. 1 is a side view of the Liquid Level Change Sensor supported in vessel to monitor liquid leak rate.

FIG. 2 is a top view of the optical scale 6 with concentric rings that measure level change as the instrument is in use. The level change is visually read from the concentric circles of scale 6.

FIG. 3 is a side view of the movement of float and rod as level changes. This change is shown as an arc 17.

DETAILED DESCRIPTION OF THE INVENTION

Referring to FIG. 1, containment vessel 10, is filled with fluid to the surface of liquid level 7. The liquid level sensor body, an open tube 11, is elevated in the containment vessel 10, by bifurcated support 5, and chain 4. The instruments elevation is maintained by chain 4, of the apparatus and containment vessels cross member 3. Coarse positioning of the instrument in the containment vessel 10, is accomplished by the attachment of the containment vessel's cross member 3.

Referring to FIG. 2, the user sees the sensible level change indication on concentric circles printed on clear plastic scale G, by movement of the float top pointer 14, that is connected to the float 8 that is attached to connecting rod 9.

Referring to FIG. 1, any change in liquid level 7, is amplified by connecting rod 9, driven by the displacement of the float 8, around the centering cross rod 13, connected by swivel 12. The forces on the center of buoyancy of float and center of gravity of float causes the float to move outward as level decreases and inward as level increases.

What is claimed is:

1. A liquid level change instrument comprising:

An instrument housing having a float attached to a rigid rod that moves in an arc proportional to liquid level change;

A sight gauge having more than one concentric circle;

A means to lower said instrument to the liquid surface so the float is allowed to center itself on an innermost circle of the sight gauge;

A means to adjust position of said float to an initial correct monitoring position via a course chain adjustment;

A means where movement of said float from the initial correct monitoring position constitutes a liquid level change over time.

* * * * *